United States Patent
Hirahara et al.

[11] Patent Number: 6,025,437
[45] Date of Patent: Feb. 15, 2000

[54] BLOCK-GRAFT COPOLYMER, SELF-CROSSLINKED POLYMER SOLID ELECTROLYTE AND COMPOSITE SOLID ELECTROLYTE MANUFACTURED THROUGH USE OF THE BLOCK-GRAFT COPOLYMER, AND SOLID CELL EMPLOYING THE COMPOSITE SOLID ELECTROLYTE

[75] Inventors: Kazuhiro Hirahara, Niigata-ken; Toru Nakanishi, Tokyo; Yoshinobu Isono; Atsushi Takano, both of Niigata-ken, all of Japan

[73] Assignee: Shin-Etsu Chemical Co., Ltd., Tokyo, Japan

[21] Appl. No.: 09/033,731

[22] Filed: Mar. 3, 1998

[30] Foreign Application Priority Data

Mar. 4, 1997 [JP] Japan ................................... 9-065285

[51] Int. Cl.[7] .............................. C08L 53/02; C08J 3/28; H01M 8/10

[52] U.S. Cl. .......................... 525/89; 525/71; 525/333.3; 526/347; 522/111; 522/186; 429/33; 429/246; 204/242

[58] Field of Search ........................ 525/89, 71, 333.3; 526/347; 522/111, 186; 429/33, 246; 204/262

[56] References Cited

U.S. PATENT DOCUMENTS 5,296,318   3/1994   Gozdz et al. .

FOREIGN PATENT DOCUMENTS

| 260925 | 3/1990 | Japan | C08G 65/28 |
| 2229826 | 9/1990 | Japan | C08L 71/02 |
| 2230667 | 9/1990 | Japan | H01M 10/40 |
| 3188151 | 8/1991 | Japan | C08L 53/00 |
| 7109321 | 4/1995 | Japan | C08F 287/00 |
| 9114294 | 9/1991 | WIPO | H01M 10/40 |

OTHER PUBLICATIONS

Kelly, I.E., J.R. Owen and B.C.H. Steele, "Poly(Ethylene Oxide) Electrolytes for Operation at Near Room Temperature," *Journal of Power Sources*. Netherlands: 14(1985) pp. 12–21.

Armand, Michel, "The History of Polymer Electrolytes," *Solid State Ionics*. 69(1994) pp. 309–319.

*Primary Examiner*—James J. Seidleck
*Assistant Examiner*—Olga Asinovsky
*Attorney, Agent, or Firm*—Loeb & Loeb, LLP

[57] ABSTRACT

There are disclosed a self-crosslinked polymer solid electrolyte, a composite solid electrolyte, and a method of manufacturing the same. A high-energy ray is irradiated to a block-graft copolymer composed of a polymer block chain A represented by formula I and a polymer block chain B represented by formula III in order to crosslink the entire the system. A nonaqueous electrolytic solution is then added to the block-graft polymer to obtain a self-crosslinked polymer solid electrolyte. The self-crosslinked polymer solid electrolyte and an electrically insulating material are combined to obtain a composite solid electrolyte.

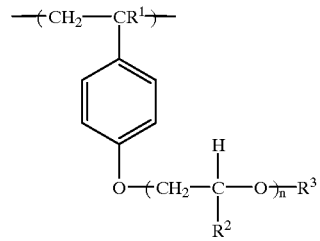

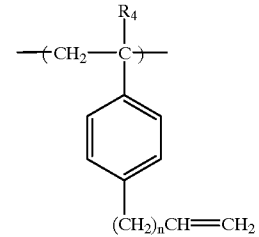

15 Claims, 1 Drawing Sheet

$^{13}C$-NMR (THF-d8)

|  |  |  |
|---|---|---|
| a, c : 42.7 | j : 35.5 | r : 70.4 |
| b, d : 40.3 | k : 139.1 | x : 72.8 |
| e : 146.2 | l : 116.3 | y : 58.9 |
| f : 127.1 | m : 137.4 |  |
| g : 133.6 | n : 127.9 |  |
| h : 140.8 | o : 114.8 |  |
| i : 36.3 | p : 157.7 |  |

BLOCK-GRAFT COPOLYMER, SELF-CROSSLINKED POLYMER SOLID ELECTROLYTE AND COMPOSITE SOLID ELECTROLYTE MANUFACTURED THROUGH USE OF THE BLOCK-GRAFT COPOLYMER, AND SOLID CELL EMPLOYING THE COMPOSITE SOLID ELECTROLYTE

BACKGROUND OF THE INVENTION

1. Field of the Invention

The present invention relates to a polymer solid electrolyte that is useful for primary cells and secondary cells, and more particularly to a self-crosslinked polymer solid electrolyte that is suitable for film-like polymer cells. The present invention also relates to a composite solid electrolyte composed of the self-crosslinked polymer solid electrolyte and an electrically insulating material, as well as to a thin solid cell utilizing the composite solid electrolyte. Further, the present invention relates to a block-graft copolymer used for manufacture of the self-crosslinked polymer solid electrolyte.

2. Description of the Related Art

As solid electrolyte, inorganic materials such as β-alumina, $Li_2TiO_3$, $RbAg_4I_5$, AgI, and tungstophosphoric acid have been developed and widely known. However, inorganic materials have drawbacks of 1) large specific gravity, 2) difficult in formation into a desired shape, 3) impossibility of obtaining soft and thin film, and 4) low ion conductivity at room temperature, which cause problems in practical use.

Recently, organic materials have become of interest as potential material that can mitigate the above-described drawbacks. Such polymer solid electrolyte is manufactured in a manner such that electrolyte (mainly inorganic salt), such as $LiClO_4$ or $LiBF_4$ —which serves as a carrier—is mixed and dissolved into a matrix polymer such as polyalkylene oxide, silicone rubber, fluororesin, or polyphosphazen. Such polymer solid electrolyte is lighter and more flexible than inorganic materials, and therefore can be easily machined or formed into film. Under such circumstance, active research and development have been conducted in recent years in order to obtain a polymer solid electrolyte that exhibits higher ionic conductivity while maintaining the above-described characters.

A presently known most effective method of imparting high ion conductivity is a technique in which aprotic organic electrolytic solution is absorbed into a polymer solid electrolyte in any manner in order to obtain solid electrolyte in the form of gel (see M. Armand, Solid States Ionics, 69, pp. 309–319 (1994)). Polymers that are usable as a matrix in the gel-type solid electrolyte are generally divided into 1) linear polymers such as polyether polymers and fluororesins, and 2) crosslinked polymers such as polyacrylic polymers.

Applications of the above-described linear polymers are shown in, for example, I. E. Kelly et al., J. Power Sources, 14, pp. 13 (1985) and U.S. Pat. No. 5,296,318. However, both cases have the problems of leakage of electrolytic solution from polymer and insufficient strength of film. Further, since electrolytic solution acts as a plasticizer for polymer serving as a matrix, the polymer itself dissolves into the electrolytic solution even when the temperature of the system increases slightly.

For the crosslinked polymers, there have been proposed a method in which a liquid monomer mixed with an electrolytic solution is polymerized to yield a crosslinked polymer including an electrolyte (see PCT/JP91/00362, International Laid-Open No. W091/14294). However, in this method, when the crosslinking degree of the polymer is increased, the ion conductivity decreases considerably, and when the crosslinking degree is decreased, the solid strength (elastic modulus) of the polymer decreases, so that film having a sufficient strength cannot be obtained.

In Japanese Patent No. 1842047 (Invention A), the applicant of the present invention proposed a block-graft copolymer, which is a model of the present invention and the method of manufacturing therefor. Also, in Japanese Patent No. 1842048 (Invention B), the applicant of the present invention proposed a polymer solid electrolyte composed of a block-graft copolymer composition in which in order to increase the ion conductivity of the block-graft copolymer, there is mixed an inorganic salt containing at least one element selected from the group consisting of Li, Na, K, Cs, Ag, Cu, and Mg in an amount of 0.05–80 mol % with respect to the alkylene oxide unit thereof.

In Japanese Patent Publication (kokoku) No. 5-74195 (Invention C), the applicant of the present invention proposed a Li cell which includes, as an electrolyte, a composite material composed of a Li ion salt and a block-graft copolymer similar to the above. Further, In Japanese Patent Application Laid-Open (kokai) No. 3-188151 (Invention D), the applicant of the present invention proposed a block-graft copolymer composition which is obtained by adding polyalkylene oxide to the above-described inorganic ion salt composite of a block-graft copolymer.

In the inventions B, C, and D, an organic solvent is added, together with an inorganic salt or the like, to a resultant block-graft copolymer in order to dissolve it, and after formation, the organic solvent is removed through drying in order to yield a polymer solid electrolyte. However, since all the polymer solid electrolytes is slightly low in terms of ion conductivity, they have not come into practical use.

In order to improve the ion conductivity, in Japanese Patent Application Laid-Open (kokai) No. 7-109321, the applicant of the present invention has proposed a composite solid electrolyte in which a nonaqueous electrolyte including a cyclic carbonate solvent and an inorganic salt is included in the same block-graft copolymer as that described above. Although the invention improved the ion conductivity, and at the same time increased the film strength drastically, it was found that if such a composite solid electrolyte is applied to household small cells in which characteristics at low temperatures (room temperature to −20° C.) are regarded as important, satisfactory lower temperature characteristics are difficult to be obtained because of the high viscosity and the high melting point of the cyclic carbonic acid ester. This problem necessitates adding, as a secondary component, a large amount of a low boiling-point linear ester or a carbonic acid ester, which is a generally known method for improving the low-temperature characteristics of cells. However, since these solvents are good solvents for the above-described block-graft copolymer, addition of a large amount of such a solvent causes dissolving of the polymer solid electrolyte itself.

Further, when the above-described composite solid electrolyte is applied to large-sized cells for use in electric vehicles and electrical power leveling systems and the like for operation at high temperatures (60–80° C.), which cells are expected to come into practical use in the future, polyalkylene oxide having low vapor pressure is optimally used as a main component. However, even in this case, use of a large amount of polyalkylene oxide causes swelling and dissolving of the polymer solid electrolyte.

SUMMARY OF THE INVENTION

In view of the foregoing, an object of the present invention is to provide a method of manufacturing a self-crosslinked polymer solid electrolyte which does not become swollen or dissolved by any kind of electrolytic solution, which allows manufacture of cells for various kinds of applications through change of the electrolytic solution, which exhibits excellent performance in holding the electrolytic solution and has increased mechanical strength, and which has high ion conductivity and improved formability.

Another object of the present invention is to provide a self-crosslinked polymer solid electrolyte manufactured by the above method.

Still another object of the present invention is to provide a composite solid electrolyte utilizing the self-crosslinked polymer solid electrolyte.

Still another object of the present invention is to provide a thin solid cell utilizing the composite solid electrolyte.

To achieve the above objects, according to a first aspect of the present invention, there is provided a block-graft copolymer composed of a polymer block chain A and a polymer block chain B at a component ratio of 1:20 to 20:1 and having a degree of polymerization of not less than 210, the polymer block chain A having a recurrent unit as represented by formula I below and a degree of polymerization of not less than 10

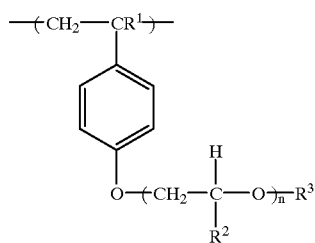

I (wherein $R^1$ represents a hydrogen atom, a methyl group, or an ethyl group; $R^2$ represents a hydrogen atom or a methyl group; $R^3$ represents a hydrogen atom, an alkyl group, an aryl group, an acyl group, a silyl group, or a cyanoalkyl group; n represents an integer between 1 and 100 inclusive; and a graft chain as represented by formula II below has a number average molecular weight of 45 to 4400),

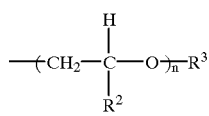

II the polymer block chain B having a recurrent unit as represented by formula III below and a degree of polymerization of not less than 200

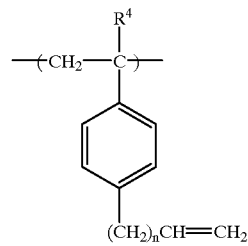

III (wherein $R^4$ represents a hydrogen atom, a methyl group, or an ethyl group; and n represents an integer of 2 or 3).

Since the block-graft copolymer has a self cross-linking property, when a high-energy ray is irradiated onto the copolymer to cause crosslinking throughout the copolymer, backbone molecules form a pseudo-crosslinked structure, thereby enhancing the mechanical strength of the film, while the graft component forms a continuous phase in order to secure passages for metal ions and serves as a compatibilizer for stably holding the electrolytic solution.

According to a second aspect of the present invention, there is provided a method of manufacturing a self-crosslinked polymer solid electrolyte. The method comprises the steps of irradiating a high-energy ray to the block-graft copolymer in order to crosslink the entire system, and adding a nonaqueous electrolytic solution to the block-graft copolymer.

Since a high-energy ray is irradiated onto the block-graft copolymer to cause crosslinking throughout the copolymer, the block-graft copolymer is not swelled or dissolved by the nonaqueous electrolytic solution, thereby enabling use as a polymer matrix of the self-crosslinked polymer solid electrolyte of the present invention.

Therefore, there can be obtained a self-crosslinked polymer solid electrolyte that is excellent in terms of performance in holding the nonaqueous electrolytic solution, mechanical strength, ion conductivity, and formability.

Preferably, the high-energy ray is an electron ray.

Preferably, the nonaqueous electrolytic solution is composed of polyalkylene oxide and a lithium inorganic salt. Alternatively, the nonaqueous electrolytic solution is composed of a lithium inorganic salt and an ester selected from the group consisting of high-boiling-point cyclic carbonic acid esters, low-boiling-point linear esters, and carbonic acid esters.

The above-described manufacturing method enables simple and reliable manufacture of a self-crosslinked polymer solid electrolyte which causes neither deterioration in mechanical strength nor leakage of the electrolytic solution even at high and low temperatures and which has high ion conductivity.

When a self-crosslinked polymer solid electrolyte is manufactured by the manufacturing method of the present invention, the self-crosslinked polymer solid electrolyte does not cause leakage of electrolytic solution or deterioration in mechanical strength at low or high temperature and has an increased ion conductivity.

According to a third aspect of the present invention, there is provided a composite solid electrolyte which comprises at least the above-described self-crosslinked polymer solid electrolyte and an electrically insulating material.

Since the composite solid electrolyte includes the above-described self-crosslinked polymer solid electrolyte and the electrically insulating material, film strength and easiness of handling are improved. Further, the composite solid electrolyte can be formed into a thin electrolyte in which the polymer component distributes uniformly throughout the electrolyte.

In this case, the self-crosslinked polymer solid electrolyte is one that has been crosslinked through use of an electron ray.

According to a fourth aspect of the present invention, there is provided a thin solid cell comprising the above-described composite solid electrolyte, a positive electrode, and a negative electrode, wherein the positive electrode contains at least the block-graft copolymer and a positive electrode active material, while the negative electrode contains at least the block-graft copolymer and a negative electrode active material.

Since the thin solid cell has a layered structure composed of the positive and negative electrodes utilizing the block-graft copolymer of the present invention and the composite solid electrolyte of the present invention, the thin solid cell has excellent mechanical strength and reduced internal resistance, and exhibits electrochemically stable cell characteristics.

The present invention also provides a positive electrode that comprises at least the block-graft copolymer and a positive electrode active material, as well as a negative electrode that comprises at least the block-graft copolymer and a negative electrode active material, which are used in the above-described thin solid cell.

In the self-crosslinked polymer solid electrolyte of the present invention, the block-graft copolymer, which is a constituent element thereof, has the following characteristics. 1) The block-graft copolymer exhibits a clear micro phase separation structure. 2) The backbone molecules having a large mechanical strength forms pseudo crosslinked structure, which serves to hold the structure and increase the strength of the material. In addition, since the phase structure can be fixed through electron-ray crosslinking, any kind of electrolytic solution can be added. 3) Even when the graft component has a relatively low molecular weight, a continuous phase is formed and passages for metal ions are secured. 4) Since the graft component serves as a compatibilizer, a large amount of an electrolytic solution of any kind can be held stably within a film. 5) Since the block-graft copolymer has crosslinking sites within the molecule, the block-graft copolymer can be crosslinked without addition of a crosslinking agent, a radical polymerization initiator, or the like.

Since the composite solid electrolyte of the present invention is composed of the above-described polymer solid electrolyte and an electrically insulating material, the composite solid electrolyte is excellent in terms of performance of holding electrolytic solution, and separation between the electrically insulating material and the polymer solid electrolyte does not occur. Further, the solid electrolyte can be formed into a thin film-like shape, and the easiness of handling can be enhanced.

Accordingly, when the composite solid electrolyte obtained through addition of a nonaqueous electrolytic solution composed of polyalkylene oxide and a lithium inorganic salt to the self-crosslinked block-graft copolymer of the present invention is applied to lithium-ion secondary cells that operate at high temperatures and are suitable for electrical power leveling systems and the like or electric vehicles, the size, especially thickness, of the cells can be effectively reduced, and considerably safe cells can be manufactured. Further, a film-shaped self-crosslinked polymer solid electrolyte of the present invention obtained through addition of a nonaqueous electrolytic solution composed of a low-boiling-point organic solvent and a lithium inorganic salt to the self-crosslinked block-graft copolymer of the present invention has excellent low-temperature characteristics, does not cause leakage of the electrolytic solution, and has excellent mechanical strength. Therefore, the film-shaped self-crosslinked polymer solid electrolyte of the present invention is suitable for household small-sized cells.

DESCRIPTION OF INVENTION, PREFERRED EMBODIMENTS, AND EXAMPLES

Figure 1:
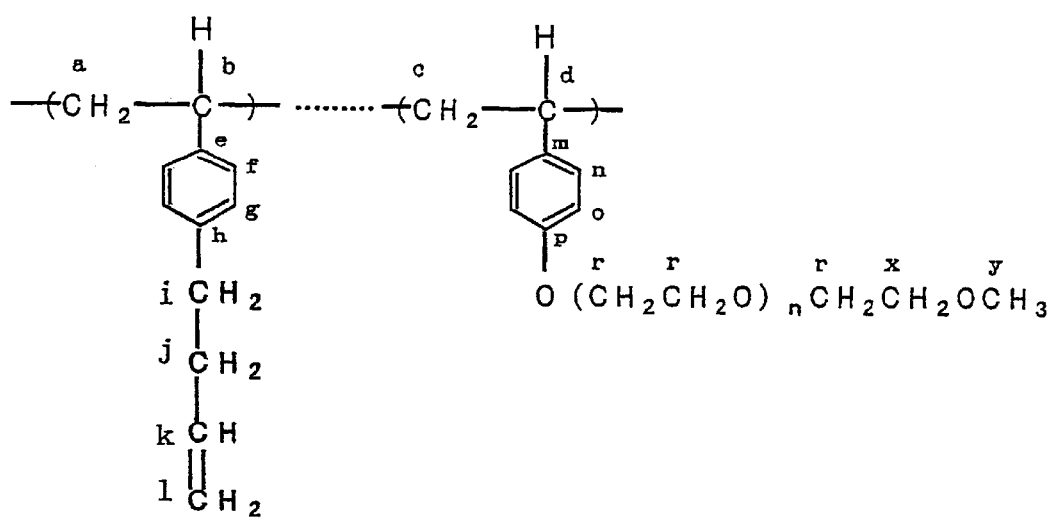
FIG. 1 is a diagram showing $^{13}$C-NMR spectrum of the block-graft copolymer obtained in Example 1-2 of the present invention.

Next, the present invention will be described in further detail. However, the present invention is not limited thereto.

The inventors of the present invention found that crosslinking a block-graft copolymer into a three-dimensional network structure is effective for obtaining a polymer solid electrolyte which makes the best use of the characteristics of the block-graft copolymer, which has excellent mechanical strength and solution holding capability, and which does not cause deterioration of cell characteristics at any temperature ranging from low to high temperature. The present invention was made based this finding.

A block-graft copolymer, which is a material for a crosslinked polymer serving as a constituent element of the self-crosslinked polymer solid electrolyte of the present invention, is basically the same as that disclosed in the above-described Japanese Patent 1842047. For convenience, a description will be given again.

The block-graft copolymer is composed of a polymer block chain A and a polymer block chain B at a component ratio of 1:20 to 20:1 and has a degree of polymerization of not less than 210. The polymer block chain A has a recurrent unit as represented by formula I below and a degree of polymerization of not less than 10.

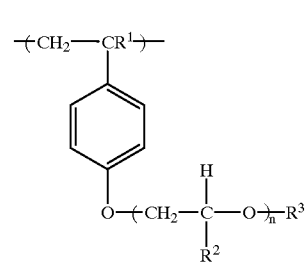

(wherein $R^1$ represents a hydrogen atom, a methyl group, or an ethyl group; $R^2$ represents a hydrogen atom or a methyl group; $R^3$ represents a hydrogen atom, an alkyl group, an aryl group, an acyl group, a silyl group, or a cyanoalkyl group; n represents an integer between 1 and 100 inclusive; and a graft chain as represented by formula II below has a number average molecular weight of 45 to 4400)

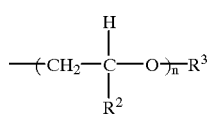

II

The polymer block chain B has a recurrent unit as represented by formula III below and a degree of polymerization of not less than 200.

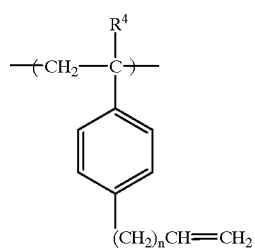

III (wherein $R^4$ represents a hydrogen atom, a methyl group, or an ethyl group; and n is an integer of 2 or 3)

In the block-graft copolymer, the polymer block chains A and B having same or different recurrent units represented by formulas I and III, respectively, are configured in any arrangement, such as AB, BAB, BAB', or BAB'AB. The polymer block chain A has a degree of polymerization of not less than 10, and the polymer block chain B has a degree of polymerization of not less than 200. The block-graft copolymer is composed of the polymer block chains A and B at a component ratio of 1:20 to 20:1 and has a degree of polymerization of not less than 210.

The polymer block chain A implements the function of a polymer electrolyte. If the degree of polymerization of the polymer block chain A is less than 10, there is not attained the expected micro phase separation structure that ionic conducting domains are arranged in continuous phase. The polymer block chain B functions to sustain mechanical strength. Accordingly, if the degree of polymerization of the polymer block chain B is less than 200, the mutual linkage of the block chains B will become insufficient, causing a reduction in the mechanical strength of a polymer membrane. Likewise, if the component ratio between the polymer block chain A and the polymer block chain B is less than 1:20, the content of a graft component will become too low to sustain the function of a polymer electrolyte. By contrast, if the component ratio is in excess of 20:1, the content of a backbone molecule component will become too low to sustain a required mechanical strength.

The above-described block-graft copolymer can be obtained as follows. For example, there is first synthesized a block copolymer T serving as a molecular backbone chain and composed of a polymer block chain C having a recurrent unit represented by formula IV:

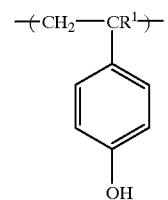

IV (wherein $R^1$ has the same meaning as described above) and a polymer block chain B having a recurrent unit represented by the above-described formula III. Subsequently, a hydroxyl group at the side chain of the block copolymer T is caused to react with an organic alkali metal represented by RMe (wherein R is t-butyl ether, diphenylethylene, benzyl, naphthalene, or cumyl group; and Me is a sodium, potassium, or cesium atom) for carbanionization. Alkylene oxide represented by formula V:

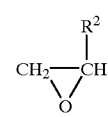

V (wherein $R^2$ has the same meaning as described above) is then added in order to grow the graft chain.

At this time, the block-graft copolymer T serving as a backbone polymer, which is composed of the block chains B and C and which is used as a starting material, can be obtained as follows. First, a phenolic hydroxyl group of a monomer compound, such as 4-hydroxy styrene, that contains a residue represented by the above-described formula IV is protected by a trialkyl group or trialkylsilyl group. The thus-protected monomer compound is subjected to polymerization together with a monomer compound such as trialkylsilyl styrene or α-alkyl-trialkylsilyl styrene through a living anion polymerization method, and is then hydrolyzed by acid or the like.

Examples of the initiator used for the above-mentioned polymerization include organic metallic compounds such as n-butyl lithium, sec-butyl lithium, and tert-butyl lithium.

Of these organic metallic compounds, sec-butyl lithium is particularly preferred. Since the molecular weight of the resultant polymer varies in accordance with the amount of the initiator used and the amount of the material compound charged, the amount of the initiator is determined in accordance with the molecular weight desired. Also, the concentration of the initiator is typically adjusted to fall within the range of $10^{-2}$ to $10^{-4}$ mol/liter in a reaction solvent, because the degree of polymerization of the block chain C constituting the block copolymer T is not less than 10.

Polymerization is usually conducted in an organic solvent. The organic solvent is preferably a solvent used for anion polymerization, such as dioxane and tetrahydrofuran. The proper range of concentration of the monomer compound subjected to the polymerization is 1 to 10 wt. %. The polymerization reaction is preferably carried out with stirring under high vacuum of $10^{-5}$ Torr or less or in an inert gas such as argon or nitrogen from which harmful substances such as moisture has been removed through purification.

Removal of the protected group is performed easily by adding dropwise an acid such as hydrochloric acid or hydrobromic acid into the monomer compound in a solvent such as acetone or methyl ethyl ketone under heating.

The carbanionization of the hydroxyl group of the thus-obtained block copolymer T is conducted as follows. The block copolymer T is dissolved into a solvent such as tetrahydrofuran such that the concentration of the block copolymer T becomes 1 to 30 wt. %, preferably 1 to 10 wt. %. Subsequently, an organic alkali metal is added to the solvent and the mixture is stirred for 30 minutes to 6 hours at 0 to 40° C.

Examples of the organic alkali metal includes t-butoxypotassium, naphthalene potassium, diphenylethylene potassium, benzyl potassium, cumyl potassium, naphthalene sodium, and cumyl cesium. Of these alkaline materials, t-butoxypotassium is particularly preferred.

When alkylene oxide represented by the above-described formula V, such as ethylene oxide or propylene oxide, is added to the carbanionized block copolymer T as vapor or liquid, and the block copolymer T is agitated for 5 to 48 hours at 40 to 80° C., a block-graft copolymer is obtained. When the polymerization solution obtained by grafting the alkylene oxide is poured into water, the block-graft copolymer precipitates. The precipitate is then filtered and dried for separation.

Characterization of the block-graft copolymer is performed as follows. The number average molecular weight of the block-graft copolymer is determined through use of a membrane osmometer. The structure and composition of the block-graft copolymer are determined on the basis of infrared absorption spectrum, $^1$H-NMR, and $^{13}$C-NMR. The degree of polymerization of the graft chain can be determined on the basis of these measurements. Further, from a GPC elution curve, judgment can be made as to whether a target copolymer has been isolated, and the distribution of the molecular weight can be estimated.

Polymerization of the block copolymer T that serves as a backbone molecule and reaction for growth of the graft chain thereof are usually conducted in an organic solvent. Examples of the organic solvent include tetrahydrofuran, dioxane, tetrahydropyran, and benzene. Examples of polymerization terminator include methyl iodide and methyl chloride.

The length of the graft chain depends on the mole number of the block chain C contained in the block-graft copolymer, the amount of the organic alkali metal used for carbanionization, and the amount of alkylene oxide. That is, the amount of the organic alkali metal must not exceed the mole number of the block chain C. The length of the graft chain is expressed by the following mathematical formula (1):

(mole number of alkylene oxide/mole number of organic alkali metal)×(molecular weight of alkylene oxide)    (1)

For example, in order to manufacture a block-graft copolymer having a graft chain length of 2000 (number average molecular weight), $5\times10^{-3}$ mol of an organic alkali metal is added to a block-graft copolymer containing $7\times10^{-3}$ mol of the block chain C for carbanionization, followed by addition of 22 g of alkylene oxide. In order to manufacture a block-graft copolymer having a graft chain length of 45 (number average molecular weight), the above-described components are used in equimolar amounts. Further, in order to manufacture a block-graft copolymer having a graft chain length between 45 to 4400 (number average molecular weight), the amounts of the above-described components are arbitrarily determined in the above-described ranges.

Next, a description will be given of a method in which the above-described block-graft copolymer is crosslinked to yield a crosslinked polymer, to which a nonaqueous electrolytic solution is added to complete a self-crosslinked polymer solid electrolyte.

Crosslinking of the block-graft copolymer is completed through irradiation of a high-energy ray.

Examples of means for exciting the crosslinking reaction include an application of an electron beam (radioactive ray), an ultraviolet ray (light), and a heat ray. The energy levels are $10^3$–$10^6$ eV for the electron beam, a few eV for the ultraviolet ray, and within the range of 0–$10^{-2}$ for the heat ray. Although any of these means may be selectively used as the crosslinking reaction exciting means, in the present invention crosslinking through use of an electron beam is preferably used, because the electron beam has a high energy level, can be controlled easily, and does not require a radical-generation agent.

When an electron beam radiation apparatus CB250/30/180L (trade name, product of Iwasaki Electric Co. Ltd.) was used, satisfactory results were obtained at an acceleration voltage of 200 kV and a dose of 10–50 Mrad.

Crosslinking through use of a heat ray is not suitable for carrying out a wide range of crosslinking with high reproducibility. Although crosslinking through use of an ultraviolet ray is a convenient method, crosslinking was not able to be performed well in some cases, depending on the shape of film. In crosslinking through use of a heat ray and an ultraviolet ray in combination, a radical-generation agent for exiting the crosslinking agent is required. However, use of the radical-generation agent makes the reaction system complicated, and in some cases, transportation of lithium ions adversely affected.

Next, description will be given of the elements of non-aqueous electrolytic solutions having characteristics directed to their respective applications, and a method of manufacturing a self-crosslinked polymer solid electrolyte.

[Electrolytic Solution for Large-sized Cells Operating at High Temperatures (60–80° C.)]

It was found that an electrolytic solution optimal for large-sized cells for use in electric vehicles and electrical power leveling systems and the like for operation at high temperatures (60–80° C.) preferably includes, as a main component, polyalkylene oxide, which has high heat stability and generates low vapor pressure at high temperature. It was also found that such electrolytic solution is suitable to the crosslinked block-graft copolymer of the present invention.

Examples of the polyalkylene oxide to be added to the crosslinked block-graft copolymer include diethylene glycol, triethylene glycol, tetraethylene glycol, polyethylene glycol, diethylene glycol monomethyl ether, polyethylene glycol monoethyl ether, polyethylene glycol monopropyl ether, diethylene glycol dimethyl ether, polyethylene glycol dimethyl ether, polyethylene glycol diethyl ether, polyethylene glycol dipropyl ether, and compounds obtained by replacing the ethylene glycol structure with a propylene glycol structure. These compounds are used singly or in combination of two or more.

Examples of the lithium inorganic salt to be added to the polyalkylene oxide include $LiClO_4$, $LiBF_4$, $LiPF_6$, $LiAsF_6$, $LiCF_3SO_3$, and $LiN(CF_3SO_2)_2$. At least one of these salts is preferably used. The concentration of the salt is preferably 0.5–3 mol/liter with respect to the amount of the polyalkylene oxide. If the concentration is not greater than 0.5 mol/liter, the number of ion carriers within an electrode decreases, resulting in a decrease in the coefficient of use. The polyalkylene oxide/the lithium inorganic salt solution is preferably added in an amount of 20 wt. % or more, more preferably 100–300 wt. %, with respect to the amount of the block-graft copolymer.

[Nonaqueous Electrolytic Solution Suitable for Household Small-sized Cells Whose Characteristics at Low Temperatures (Room Temperature to −20° C.) are Important]

A polymer solid electrolyte suitable for household small-sized cells used in cameras, video cameras, and the like is required to maintain ion conductivity even at low temperatures (room temperature to −20° C.). In order to satisfy the requirement, in the present invention, in addition to a cyclic carbonic acid ester having a high viscosity, a linear ester or a linear carbonic acid ester having a low viscosity and a high dielectric constant is added to a nonaqueous electrolytic solution in order to reduce the viscosity of the overall nonaqueous electrolytic solution.

The nonaqueous electrolytic solution to be added to the above-described crosslinked block-graft copolymer is composed of a lithium inorganic salt and an ester selected from the group consisting of high-boiling-point cyclic carbonic acid esters, low-boiling-point linear esters, and low-boiling point carbonic acid esters. Specific examples of the high-boiling-point cyclic carbonic acid esters include ethylene carbonate, propylene carbonate, γ-butyrolactone, and 2-methyl-γ-butyrolactone. Specific examples of low-boiling-point linear esters and carbonic acid esters include 1,2-dimethoxyethane, methoxyethoxyethane, dioxolan, 4-methyldioxolan, 2-methyldioxolan, diethylcarbonate, dimethylcarbonate, acetonitrile, tetrahydrofuran, and 2-methyltetrahydrofuran. At least one of the above-described high-boiling-point cyclic carbonic acid esters is mixed with at least one of the above-described low-boiling-point linear esters and carbonic acid esters at a ratio (volume ratio) of 20:80 to 80:20.

Examples of the lithium inorganic salt are the same as those described above. The concentration of the salt is preferably 0.5–3 mol/liter with respect to the amount of the organic solvent. If the concentration is not greater than 0.5 mol/liter, the number of ion carriers within an electrode decreases, resulting in a decrease in the coefficient of use. The nonaqueous electrolytic solution/the lithium inorganic salt solution is preferably added in an amount of 20 wt. % or more, more preferably 100–300 wt. %, with respect to the amount of the crosslinked block-graft copolymer.

No limitation is imposed on a method of mixing the nonaqueous electrolytic solution into the above-described crosslinked block-graft copolymer. For example, there may be used a method in which the nonaqueous electrolytic solution is added to the crosslinked block-graft copolymer, which is then kneaded mechanically at room temperature or with heat, or a method in which the nonaqueous electrolytic solution and the crosslinked block-graft copolymer are dissolved into a solvent common to both and then formed into film, and the thus-obtained film is immersed into the nonaqueous electrolytic solution. Especially, in the latter method, since the saturation amounts of the polyalkylene oxide and the aqueous electrolytic solution within the crosslinked block-graft copolymer are univocally determined depending on the composition of the graft chain, adjustment of film-shaped solid electrolyte is easily and highly reproducible.

Next, a description will be given of the composite solid electrolyte of the present invention.

The composite solid electrolyte of the present invention comprises at least the above-described self-crosslinked polymer solid electrolyte and an electrically insulating material.

The insulating material used in the present invention can be any material which has through-spaces extending between both sides thereof. Examples of such material include electrically non-conductive porous membranes, nonwoven fabrics, and mesh-like woven fabrics. Examples of such porous membranes include plastic separators (polypropylene separators, polyethylene separators, or polypropylene-polyethylene separator composites) for use in commercial lithium cells, and Teflon, polyester, polyamide, polyimide used as filter materials. Examples of such nonwoven fabrics include separators for use in commercial lithium cells. Examples of such mesh-like woven fabrics include screen meshes (formed from nylon, polyester, or silk). The electrically insulating material is selected according to an application of the solid electrolyte. When the solid electrolyte is to be used in the form of a membrane, a plastic porous membrane is suited for the electrically insulating material in view of the support strength and electrochemical stability of the solid electrolyte. In this case, the thickness of the solid electrolyte membrane is preferably 10 μm to 25 μm.

Next, will be described an example of the method of manufacturing the composite solid electrolyte according to the present invention.

First, the aforementioned block-graft copolymer is dissolved in an appropriate organic solvent to thereby obtain a polymer solution. The organic solvent is selected from cyclic ether compounds such as 1,4-dioxane, 1,3-dioxolan, and THF. The copolymer is dissolved preferably in an amount of 5 wt. % to 20 wt. %. Any other solvent may be used so long as it can dissolve the block-graft copolymer of the present invention. Examples of such solvent include chain ester compounds such as dimethyl carbonate and diethyl carbonate; chain ether compounds such as dimethyl ether; nitryl compounds such as acrylonitrile; chlorine compounds such as chloroform and methylene chloride; and N-methyl pyrolidone and N,N-dimethyl formamide. These solvents may be used singly or in combination.

Next, the aforementioned electrically insulating material is immersed in the above polymer solution so as to obtain a polymer composite. When a plastic porous membrane is employed as the electrically insulating material, it is important to make the polymer solution permeate the membrane deep into pores through reduction of pressure or application of ultrasonic. An alkali metal salt may be previously added into the polymer solution.

Subsequently, the organic solvent is evaporated from the electrically insulating material soaked with the polymer solution, and crosslinking reaction is caused through irradiation of a high-energy ray. Although various kinds of high-energy rays can be used as the means for exciting the crosslinking reaction, an electron beam is preferably used because of the above-described reason.

The composite solid electrolyte of the present invention can be obtained by adding the above-described nonaqueous electrolytic solution into the composite material composed of the crosslinked polymer and the electrically insulating material.

Next, a description will be given of the structure of a thin solid cell of the present invention and the method of manufacturing the thin solid cell.

The thin solid cell of the present invention is obtained by arranging the aforementioned composite solid electrolyte, a positive electrode, and a negative electrode in layers. Adding an ionic conducting compound similar to an electrolyte component to the electrodes effectively activates a lithium-related oxidation-reduction reaction in the electrodes. The method of manufacturing an electrode material will next be described.

First, the aforementioned block-graft copolymer and the aforementioned alkali metal salt are dissolved in the aforementioned organic solvent similar to that used in the manufacture of the composite solid electrolyte.

As in the manufacture of the composite solid electrolyte, the alkali metal salt is mixed with the block-graft copolymer in an amount of 1 wt. % to 80 wt. %, preferably 3 wt. % to 20 wt. %, based on the total weight of ethylene oxide derivatives contained in the block-graft copolymer. If the alkali metal salt content is less than 1 wt. %, the number of ion carriers in an electrolyte is reduced, resulting in a reduction in electrode utilization rate. By contrast, if the alkali metal salt content is in excess of 80 wt. %, the salt precipitates due to saturated dissolution, resulting in a reduction in electrode strength.

To the thus-obtained solution is added an electrode active material to thereby obtain an electrode composition slurry. Examples of the active material for a positive or negative electrodes used in the thin solid cell of the present invention include individual metals such as metallic lithium, metallic silver, and metallic zinc; alloys such as Li-Al; carbon materials such as graphite, carbon black, graphite fluoride, and polyacetylene; metal oxides such as $MnO_2$, $CoO_2$, $V_2O_5$, $V_6O_{13}$, $TiO_2$, $WO_2$, $Cr_2O_5$, $Cr_3O_8$, $CuO$, $Cu_2V_2O_7$, $Bi_2O_3$, $Bi_2PB_2O_5$, and $Mo_8O_2$; chalcogenides such as $TiS_2$, $TiS_3$, $MoS_2$, $CuCO_2S_4$, $VSe_2$, $NbSe_2CrS_2$, and $NbSe_3$; oxyacid salts of silver such as $Ag_2CrO_4$, $Ag_2MoO_4$, $AgIO_3$, and $Ag_{22}P_2O_7$; and π-conjugated polymers such as polyaniline, polypyrrole, polythiophene, and poly-p-phenylene.

The electrode active material is mixedly added to the solution in an amount of 40 wt. % to 90 wt. %, preferably 50 wt. % to 70 wt. %, based on other solute components. If the active material content is in excess of 90 wt. %, the electrode utilization rate is reduced. By contrast, if the active material content is less than 40 wt. %, the amount of oxidation-reduction reaction in an electrode is reduced, resulting in a reduction in cell capacity. The electrode composition slurry is applied onto an electrode support, a Teflon plate, or the like. Then, the solvent is evaporated to obtain a positive or negative electrode.

In the present invention, a conducting agent may be mixedly added to the electrode composition solution as needed. Examples of such a conducting agent include natural graphite, coke, carbon black, artificial graphite such as carbon materials obtained through thermal decomposition, and kish graphite. They are used singly or in combination.

Next, the positive electrode, the composite solid electrolyte, and the negative electrode are arranged in layers in this order, obtaining a laminate. This laminate is packed with a sealing material. Then, positive and negative terminals are attached to the laminate to thereby obtain the thin solid cell of the present invention.

Examples of the sealing material include a thin aluminum membrane. A thermoplastic such as polyethylene may be used as a sealing material for the purpose of sealing the peripheral portion of the cell. For example, aluminum, polyethylene laminate film or the like can be used.

PREFERRED EMBODIMENTS

Next, embodiments of the present invention will be described in more detail. However, the present invention is not limited thereto.

In the examples, each block copolymer is expressed by connecting the respective components with "-b-." For example, a three-component tertiary block copolymer composed of polybutenylstyrene, polyhydroxystyrene, and polybutenylstyrene is represented by poly(butenylstyrene-b-hydroxystyrene-b-butenylstyrene). Also, each graft copolymer is expressed by connecting the respective components with "-g-." For example, a block-graft copolymer obtained through polymerization of polyethylene oxide and a three-component tertiary block copolymer composed of polybutenylstyrene, polyhydroxystyrene, and polybutenylstyrene is represented by poly(butenylstyrene-b-(hydroxystyrene-g-ethylene oxide)-b-butenylstyrene).

EXAMPLES

Example 1-1

(Poly(butenylstyrene-b-hydroxystyrene-b-butenylstyrene); Synthesis of a Block Copolymer T Serving as a Backbone Polymer Chain)

Sec-butyl lithium ($1.50 \times 10^{-4}$ mol) serving as an initiator was added to tetrahydrofuran (250 ml) under a high vacuum of $10^{-5}$ Torr. While the resulting mixed solution was maintained at $-78°$ C., 11.82 g of butenylstyrene diluted with 100 ml of tetrahydrofuran was added to the solution. The mixture was stirred for 15 minutes for polymerization. The resulting reaction mixture had a light yellow color. To the solution was added 6.79 g of tert-butoxystyrene diluted with 100 ml of tetrahydrofuran. The mixture was stirred for 15 minutes for polymerization. The resulting solution presented a dark yellow color. To the solution was added 11.82 g of butenylstyrene diluted with 100 ml of tetrahydrofuran. The mixture was stirred for 15 minutes for polymerization. The resulting solution turned light yellow again. Upon completion of polymerization, the reacted mixture was put in methanol to precipitate the formed polymer, followed by separation and drying to obtain 30.43 g of a polymer (polymerization yield: 100%).

The polymer showed a unimodal GPC elution curve and a high degree of monodispersion of molecular weight (Mw/Mn=1.02). Also, the polymer showed a number average molecular weight of $20.2 \times 10^4$ g/mol as measured by the membrane osmotic-pressure method. The infrared absorption spectral data and $^1$H-NMR analysis results are as follows.

Infrared absorption spectrum (wave numbers of maximal absorptions: /cm, KBr): 3075, 3050, 3010, 2977, 2923, 2850, 1899, 1639, 1606, 1506, 1448, 1419, 1338, 1365, 1236, 1162, 1099, 1020, 995, 910, 819, 626, 567

$^1$H-NMR ($CDCl_3$): 1.1–1.9 ppm: (broad, —$CH_2$—CH—, 3H) 1.0–1.2 ppm: (s, t-butyl, 9H) 1.9–2.2 ppm: (s, —$CH_2$—, 2H) 2.2–2.5 ppm: (s, —$CH_2$—, 2H) 4.6–4.9 ppm: (d, =$CH_2$, 2H) 5.4–5.7 ppm: (s, —CH=, 1H) 6.0–6.8 ppm: (broad, phenyl, 4H)

From the above results, it was confirmed that the obtained polymer was poly(butenylstyrene-b-tert-butoxystyrene-b-butenylstyrene). Individual monomers had the following values of degree of polymerization: 500 for each butenylstyrene located on both ends; 250 for tert-butoxystyrene. Thus, the total degree of polymerization was 1250.

The thus-obtained tri-block copolymer was dissolved in acetone. The solution was hydrolyzed for 6 hours while being refluxed with hydrochloric acid, thereby synthesizing poly(butenylstyrene-b-hydroxystyrene-b-butenylstyrene) composed of butenylstyrene (50 parts), hydroxystyrene (25 parts), and butenylstyrene (50 parts). The infrared absorption spectral data and $^1$H-NMR analysis results of the tri-block copolymer are as follows:

Infrared absorption spectrum (wave numbers of maximal absorptions: /cm, KBr): 3430, 3075, 3048, 3010, 2977, 2923, 2850, 1899, 1639, 1612, 1511, 1448, 1419, 1363, 1334, 1230, 1170, 1116, 1114, 1101, 1020, 995, 910, 823, 628, 561

$^1$H-NMR (1,4-Dioxane-d8): 1.0–1.8 ppm: (broad, —$CH_2$—CH—, 3H) 1.9–2.2 ppm: (s, —$CH_2$—, 2H) 2.2–2.5 ppm: (s, —CH$_2$—, 2H) 4.6–4.8 ppm: (d, =CH$_2$, 2H) 5.3–5.7 ppm: (s, —CH=, 1H) 6.0–7.7 ppm: (broad, phenyl, 4H)

In this product of poly(butenylstyrene-b-hydroxystyrene-b-butenylstyrene), the percentage composition and molecular weight of butenylstyrene, hydroxystyrene, and butenylstyrene can be freely determined through appropriate determination of the amount of placement of the monomers and the concentration of the initiator.

Example 1-2

(Synthesis of a Block-graft Copolymer from poly (butenylstyrene-b-hydroxystyrene-b-butenylstyrene) Through Use of Ethylene Oxide)

Poly(butenylstyrene-b-hydroxystyrene-b-butenylstyrene) (20.5 g) obtained in Example 1-1 was dissolved in tetrahydrofuran (883 ml) under a high vacuum of 10$^{-5}$ Torr. To the resulting solution was added tert-butoxypotassium (55.7 millimoles) at 25° C.. The mixture was stirred for 1 hour, and then ethylene oxide (39.8 g) was added thereto. The resulting mixture was stirred for 20 hours while being maintained at 70° C. Subsequently, methyl iodide was added to the mixture to terminate polymerization. The reaction mixture was put in water to precipitate the formed polymer, followed by separation and drying to obtain 59.1 g of the polymer (sample No. T-1; yield: 98%).

The polymer T-1 showed a unimodal symmetric GPC elution curve and a very narrow monodispersion of molecular weight (Mw/Mn=1.04), proving itself to be a unitary polymer. Further, as shown in FIG. 1, the results of $^{13}$C-NMR measurement confirmed that grafting onto hydroxystyrene serving as a backbone molecule was substantially 100%, the composition percentage of polyethylene oxide was 66%, and the degree of polymerization of the graft chain was 34 (number average molecular weight: 1500 g/mol).

Example 1-3

(Electron Beam Crosslinking of a Block-graft Copolymer)

3.0 g of the above-mentioned block-graft copolymer (sample No. T-1) were dissolved into tetrahydrofuran (THF), and the resultant mixture was placed and spread on a Teflon plate to obtain a sample. The sample was allowed to stand at room temperature for 24 hours in a stream of argon in order to remove the excess portion of the solvent. Subsequently, the sample was dried at 90° C. for 24 hours under reduced pressure to yield a film having a thickness of approximately 30 μm. An electron beam was irradiated onto the film at an acceleration voltage of 200 kV and a dose of 10 Mrad. for crosslinking, and the film was immersed into THF in order to evaluate the degree of crosslinking. The result showed that the shape of the film changed little although the thickness of the film increased by approximately 30% to 40 μm.

Example 2

(Synthesis of a Block-graft Copolymer Having a Different Composition)

A block-graft copolymer was synthesized under the same conditions as those of Example 1-2 except that ethylene oxide was added in a different amount. Table 1 shows the compositions of the thus-obtained block-graft copolymers. The block-graft copolymers were respectively unitary polymers showing a narrow distribution of molecular weight.

TABLE 1

| Sample No. | Amount of ethylene oxide added (g) | Graft chain Composition (%) | Number average molecular weight (Mn) | Degree of polymerization (n) | Number average molecular weight of block-graft copolymer (Mn × 10$^4$) Graft chain portions | Whole |
|---|---|---|---|---|---|---|
| T-2 | 17.3 | 46.4 | 650 | 14.8 | 16.3 | 35.1 |
| T-3 | 26.8 | 57.3 | 1,010 | 23 | 25.3 | 44.1 |

Examples 3–13

(Evaluation of Degree of Crosslinking Upon Irradiation with an Electron Beam at Different Degrees of Energy)

The block-graft copolymers (sample Nos. T-1 to T-3) synthesized in Examples 1-2 and 2 were formed into respective films in a manner similar to that of Example 1-3. The films were irradiated with an electron beam at different degrees of energy for evaluation of the degree of crosslinking. Table 2 shows the results of evaluation of crosslinking conditions and the degree of crosslinking.

TABLE 2

| | Sample of block-graft copolymer | Irradiation of electron beam Beam current (mA) | Dose (Mrad) | Solbility in THF |
|---|---|---|---|---|
| Example 3 | T-1 | 10 | 3 | Swollen to a large degree |
| Example 4 | T-1 | 10 | 5 | Swollen |
| Example 5 | T-1 | 25 | 25 | Not dissolved |
| Example 6 | T-1 | 25 | 50 | Not dissolved |
| Example 7 | T-2 | 10 | 5 | Swollen |
| Example 8 | T-2 | 10 | 10 | Not dissolved |
| Example 9 | T-2 | 12.5 | 25 | Not dissolved |
| Example 10 | T-3 | 10 | 5 | Swollen |
| Example 11 | T-3 | 10 | 10 | Not dissolved |
| Example 12 | T-3 | 12.5 | 25 | Not dissolved |
| Example 13 | T-3 | 25 | 100 | Film degraded |

Acceleration voltage was set at 200 kv for all samples.

From the evaluation results, it was found that a block-graft copolymer must be irradiated with an electron beam at a dose of not less than 10 Mrad for crosslinking and becomes insoluble in THF upon such irradiation. At less than 10 Mrad, a crosslinking reaction did not progress smoothly, and at 100 Mrad. or higher, a film degraded significantly, and the film strength was low. Accordingly, in the present invention, a proper dose of an electron beam is 10–50 Mrad.

Example 14

(Manufacture of a Self-crosslinked Polymer Solid Electrolyte for High Temperature Cells Through Addition of Nonaqueous Electrolytic Solution Composed of Polyalkylene Oxide and Lithium Inorganic Salt)

5.0 g of the block-graft copolymer (sample No. T-1) obtained in Example 1-2 were dissolved into 100 ml of 1,4-dioxane, and the resultant mixture was placed and spread on a Teflon plate to obtain a sample. The sample was allowed to stand at room temperature for 24 hours in a stream of argon in order to remove the excess portion of the solvent. Subsequently, the sample was dried at 90° C. for 24 hours under reduced pressure to yield a film having a thickness of 100 μm. An electron beam was irradiated onto the film at an acceleration voltage of 200 kV and a dose of 25 Mrad. for crosslinking, and for 20 hours the film was immersed into an electrolytic solution which was prepared by dissolving LiClO$_4$ into polyethylene glycol dimethylether (Mn=350) at a concentration of 1.0 mol/liter. The results showed that the shape of the film changed little although the thickness of the film increased somewhat to 140 μm.

The thus-obtained polymer solid electrolyte film was strong even though the film contained polyethylene glycol dimethylether in an amount of 150 wt. % based on the amount of the block-graft copolymer. The elastic modulus of the film as measured with a dynamic viscoelasticity tester RSA-II (trade name, product of Reometric Inc.) was $1.3 \times 10^6$ dyne/cm$^2$ or more. Also, even when the polymer solid electrolyte film was compressed under a load of 50 kg/cm$^2$, polyethylene glycol dimethylether contained therein did not exude.

The results of a thermal analysis performed through use of a differential thermal balance showed that the weight of the film did not decrease at temperatures up to 150° C. and therefore exhibited very high thermal stability. Also, since no volatile component was generated even at high temperatures, the polymer solid electrolyte is a polymer solid electrolyte having a very high degree of safety. Independently, the film was cut into a circular sheet having a diameter of 10 mm, and the circular sheet was sandwiched between two lithium electrode plates. In order to measure the impedance of the film, these electrode plates were connected to an AC impedance measurement apparatus for the frequency range of 5 Hz to 5 MHz (Multi-frequency LCRX meter, model 4192A (trade name, product of Yokogawa-Hewlett-Packard, Ltd.)). In accordance with a complex impedance method, the ion conductivity of the film was calculated. The calculation results showed that the ion conductivity was $0.9 \times 10^{-3}$ S/cm at 80° C.

Examples 15–22

(Manufacture of Self-crosslinked Polymer Solid Electrolytes Through Addition of Different Types of Polyalkylene Oxide and Lithium Inorganic Salt)

Polymer solid electrolytes were manufactured in a manner similar to that of Example 14 except that the added non-aqueous electrolytic solution was composed of a polyalkylene oxide and a lithium inorganic salt as shown in Table 3. The thus-manufactured polymer solid electrolytes were tested for evaluation in the same manner as in Example 14. The evaluation results are shown in Table 3.

TABLE 3

Types and amounts of polyalkylene oxide and lithium inorganic salt

| | Type of block-graft copolymer | Dose of electron beam (Mrad) | Polyalkylene oxide (Vol. %) | Lithium inorganic salt Type | Concentration (*) | Amount of addition (wt. %) | Elastic modulus () | Ion conductivity (*) |
|---|---|---|---|---|---|---|---|---|
| Ex.15 | T-1 | 10 | Polyethylene glycol dimethylether, Mn350 (70) Diethylene glycol dimethylether (30) | LiPF$_6$ | 0.5 | 190 | 1.8 | 1.9 |
| Ex.16 | T-1 | 25 | Polyethylene glycol, Mn200 | LiBF$_4$ | 1.0 | 180 | 1.9 | 1.8 |
| Ex.17 | T-1 | 50 | Polyethylene glycol dimethylether, Mn500 | LiPF$_6$ | 1.2 | 100 | 4.7 | 0.1 |
| Ex.18 | T-2 | 25 | Polyethylene glycol dimethylether, Mn350 (50) Diethylene glycol diethylether (50) | LiClO$_4$ | 1.0 | 120 | 2.9 | 1.1 |
| Ex.19 | T-2 | 50 | Polyethylene glycol dimethylether, Mn500 (30) Diethylene glycol dimethylether (70) | LiCF$_3$SO$_3$ | 1.2 | 170 | 2.5 | 4.2 |
| Ex.20 | T-3 | 10 | Diethylene glycol (80) Diethylene glycol dimethylether (20) | LiAsF$_6$ | 3.0 | 80 | 3.7 | 0.3 |
| Ex.21 | T-3 | 25 | Polyethylene glycol dimethylether, Mn350 (30) Diethylene glycol diethylether (70) | LiClO$_4$ | 1.0 | 180 | 1.9 | 3.9 |
| Ex.22 | T-3 | 25 | Polyethylene glycol dimethylether, Mn350 | LiPF$_6$ | 1.0 | 170 | 2.1 | 1.8 |

*(mol/l),
**($10^{-6}$dyne/cm$^{-2}$),
***(80° C., $10^{-3}$S/cm)

As seen from Table 3, even though a large amount of electrolyte is contained, the self-crosslinked polymer solid electrolytes according to the present invention exhibit high film strength and can stably maintain high ion conductivity even at high temperatures.

Examples 23–30

(Manufacture of Self-crosslinked Polymer Solid Electrolytes Optimally Suited for Nonindustrial Small-sized Cells Through Addition of Nonaqueous Electrolytic Solution Composed of Different Types of Organic Solvent and Lithium Inorganic Salt)

Films each formed of a block-graft copolymer (sample Nos. T-1 to T-3) was irradiated with an electron beam (radiation) for crosslinking, followed by addition of non-aqueous electrolytic solution composed of different types of organic solvent and lithium inorganic salt. The thus-manufactured crosslinked polymer solid electrolytes having excellent low-temperature characteristics were similarly tested for evaluation. The evaluation results are shown in Table 4.

TABLE 4

| | | | Types and amounts of nonaqueous electric solution | | | | | |
|---|---|---|---|---|---|---|---|---|
| | | Dose of | | Lithium inorganic salt | | | Ion conduc- | |
| | Type of block-graft | electron beam | Organic solvent | | Concent- ration | Amount of addition | Elastic modulus | tivity (***) |
| | copolymer | (Mrad) | (vol. %) | Type | (*) | (et. %) | (**) | 25° C. | −20° C. |
| Ex.23 | T-1 | 10 | Ethylene carbonate (50) Tetrahydrofuran (50) | LiClO$_4$ | 1.0 | 160 | 4.5 | 2.4 | 1.1 |
| Ex.24 | T-1 | 25 | Ethylene carbonate (70) Diethyl carbonate (30) | LiPF$_6$ | 1.2 | 150 | 4.5 | 1.6 | 0.6 |
| Ex.25 | T-2 | 10 | γ-Butyrolactone (20) 1,2-Dimethoxyethane (80) | LiAsF$_6$ | 1.5 | 230 | 1.9 | 3.3 | 1.9 |
| Ex.26 | T-2 | 10 | Propylen carbonate (60) Dioxolan (40) | LiPF$_6$ | 2.0 | 120 | 6.3 | 1.0 | 0.1 |
| Ex.27 | T-2 | 25 | 2-Methyl-γ-butyrolactone (60) 2-Methyltetrahydrofuran (40) | LiCF$_3$SO$_3$ | 0.5 | 150 | 3.1 | 2.8 | 1.4 |
| Ex.28 | T-3 | 10 | Ethylene carbonate (60) 1,2-Dimethoxyethane (40) | LiClO$_4$ | 1.0 | 180 | 2.6 | 1.9 | 0.6 |
| Ex.29 | T-3 | 25 | Ethylene carbonate (80) Acetonitrile (20) | LiN(CF$_3$SO$_2$)$_2$ | 1.0 | 140 | 8.9 | 1.1 | 0.1 |
| Ex.30 | T-3 | 25 | Propylen carbonate (70) Diethyl carbonate (30) | LiPF$_6$ | 1.0 | 170 | 7.6 | 1.5 | 0.4 |

*(mol/l),
**($10^{-6}$dyne/cm$^2$),
***($10^{-3}$S/cm)

From the evaluation results, it was found that the crosslinked polymer solid electrolytes manufactured according to the present invention exhibit excellent ion conductivity even at low temperatures and have high film strength.

Comparative Example 1

A film-shaped solid electrolyte having a thickness of 100 μm was manufactured in accordance with the method of forming a polymer solid electrolyte described in U.S. Pat. No. 5,296,318. Kynar FLEX2801 (trade name, polymer product of Atochem Corp.)(1.5 g) and 1 mol/liter of LiPF$_6$ in propylene carbonate (1.5 g) were dissolved into tetrahydrofuran (9 g) and mixed. The mixture was then cast on a Teflon Petri dish and allowed to stand at room temperature for 10 hours in order to yield a film having a thickness of 100 μm. When approximately 12 hours elapsed after the film was left on a glass plate, propylene carbonate of the electrolytic solution flowed out of the film.

Comparative Example 2

A film-shaped solid electrolyte having a thickness of 100 μm was manufactured from a polymer described in Japanese Patent Publication (koukoku) No. 5-74195; that is, a block-graft copolymer before being crosslinked used in Example 1. When the film was immersed in the electrolytic solution composed of polyalkylene oxide and a lithium inorganic salt described in Example 20, the film took for about 2 minutes to be dissolved. When the film was immersed in the non-aqueous electrolytic solution having a composition used in Example 25, the film dissolved within about 30 seconds.

[Examples of Manufacture of Composite Electrolytes]

Example 31

Polymer T-1 obtained in the above-described Example 1-2 (1 part), 1,4-dioxane (45 parts), and benzene (5 parts) were mixed to obtain a homogeneous solution. Several cycles of a process consisting of immersing Celgard 2500 (trade name, product of Hoechst Co., polypropylene porous film, film thickness 25 μm, porosity 40%), in the homogeneous solution, degassing, pulling out the film, and air-drying the film were performed, to thereby obtain a composite having a thickness of 35 μm.

Subsequently, the composite was irradiated with an electron ray (dose 5 Mrad) to cause bond clevage at butenyl groups in Polymer T-1 for crosslinking reaction.

The composite was dried under reduced pressure at 90° for 48 hours and then was immersed in an electrolyte consisting of ethylene carbonate/dimethyl carbonate (volume ratio 1/1) and 1M LiPF$_6$ for 12 hours to thereby obtain a composite solid electrolyte having a total film thickness of 40 μm.

Example 32

A composite having a total film thickness of 35 μm was obtained in a manner similar to that conducted in Example 31 except that Polymer T-3 obtained in Example 2 was used instead of Polymer T-1 used in Example 31 and that Teflon porous film of NTF 1026 (trade name, product of NITTO DENKO CORPORATION, film thickness 25 μm, porosity 85%) was used as an electrically insulating material.

Subsequently, the composite was irradiated with an electron ray (dose 5 Mrad), dried under reduced pressure at 900 for 48 hours, and then was immersed in an electrolyte consisting of ethylene glycol dimethyl ether oligomer (molecular weight 350)/1M LiPF$_6$ for 12 hours to thereby obtain a composite solid electrolyte having a total film thickness of 40 μm.

Comparative Example 3

Kynar FLEX 2801 (trade name, product of Elf Atochem Co., (vinylidene fluoride/hexafluoropropylene (VdF/HFP)) random copolymer) (1 part), THF (50 parts), and the electrolyte used in Example 31 (4 parts) were mixed to obtain a homogeneous solution.

Celgard 2500 (trade name, product of Hoechst Co., film thickness 25 μm, porosity 40%) was immersed in the homogeneous solution and subsequently air-dried. This process was repeated to thereby obtain a composite electrolyte having a thickness of 40 μm.

Comparative Example 4

The electrolyte used in Example 31 (5 parts) was added to an oligomer solution (1 part) obtained through mixing 2-ethoxyethyl acrylate (EA)/acrylonitrile (AN)/triethylene glycol dimethyl acrylate (TGDA) at a weight ratio 6/2/1, to thereby obtain a solution. Teflon porous film of NTF 1026 (trade name, product of NITTO DENKO CORPORATION) was immersed in the solution. Immediately after the film was taken out of the solution, the oligomers were thermally polymerized, to thereby obtain a composite electrolyte having a total thickness of 40 μm. AIBN (2,2'-azobis(2-methylpropionitrile)) was added in an amount of 5 wt. % to the solution as a thermal polymerization initiator.

The compositions of the composite electrolytes are shown in Table 5.

TABLE 5

|  | Porous film | Polymer | Electrolyte |
| --- | --- | --- | --- |
| Example 31 | 15 | 15 | 70 |
| Example 32 | 5 | 15 | 80 |
| Comp. Ex. 3 | 20 | 20 | 60 |
| Comp. Ex. 4 | 10 | 20 | 70 |

Since the electrolyte used in Comparative example 3 contains dimethyl carbonate having a low boiling point, the decrease of the electrolyte fraction is considered to be loss in volume induced through evaporation during immersion and drying. Since Kynar FLEX 2801 is formed of a fluorine-containing polymer, it absorbs only small amount of an electrolyte. To overcome this drawback, a certain ratio of the electrolyte needs to be added in advance. Moreover, use of such a low-boiling point solvent which evaporates during fabrication of a composite results in disadvantageously low ionic conductivity of the produced composite.

In Comparative Example 4, thermal polymerization is performed to combine the polymer with porous film. Consequently, use of such a low-boiling point solvent which evaporates during thermal polymerization also leads to a lowered ionic conductivity of the fabricated composite.

The evaluation results of the ionic conductivities of the electrolytes, retention characteristics of the electrolytes, and adhesion of the polymer to the porous film will be shown in Table 6.

TABLE 6

|  | Ionic conductivity[1] (S/cm) | Electrolyte retention[2] (%) | Adhesion[3] |
| --- | --- | --- | --- |
| Example 31 | $1 \times 10^{-3}$ | 99 | O |
| Example 32 | $5 \times 10^{-4}$ | 99 | O |
| Comp. Ex. 3 | $7 \times 10^{-4}$ | 95 | X |
| Comp. Ex. 4 | $8 \times 10^{-4}$ | 97 | X |

[1]Values measured at 25° C.
[2]Retention ratios of the electrolytes measured after they were allowed to stand at 60° C. for 3 days.

As shown in Table 6, composite solid electrolytes of Examples 31 and 32 exhibited excellent ionic conductivities, retention characteristics, and adhesion as compared with those of electrolytes of Comparative Examples.

[Examples of Fabrication of Composite Positive Electrodes]

Example 33

Polymer T-1 obtained in the above-described Example 1-2 (1 part), $LiPF_6$ (0.15 parts), $LiCoO_2$ as a positive electrode active substance (5 parts), 1,4-dioxane (30 parts), 1,3-dioxorane (5 parts) and carbon black (6 parts) were mixed to obtain a colloidal solution.

The colloidal solution was applied on Al foil and dried to remove the solvent, to thereby obtain a composite positive electrode having a thickness of 50 μm.

Example 34

Polymer T-2 obtained in the above-described Example 2 (1 part), $LiBF_4$ (0.15 parts), $LiMnO_2$ as a positive electrode active substance (5 parts), THF (30 parts), and carbon black (6 parts) were mixed to obtain a colloidal solution.

The colloidal solution was applied on Al foil and dried to remove the solvent in a manner similar to that conducted in Example 33, to thereby obtain a composite positive electrode having a thickness of 60 μm.

Comparative Example 5

A composite positive electrode having a thickness of 50 μm was manufactured in the same manner as in Example 33 except that one part of Kynar FLEX 2801 (trade name, product of Elf Atochem Co.) was used in place of polymer T-1, and 30 parts of THF was used as a solvent.

Comparative Example 6

A composite positive electrode having a thickness of 60 μm was manufactured in the same manner as in Example 34 except that in place of polymer T-2, there was used one part of an oligomer solution obtained through mixing 2-ethoxyethyl acrylate (EA)/acrylonitrile (AN)/triethylene glycol dimethyl acrylate (TGDA) at a weight ratio 6/2/1, to thereby obtain a solution.

[Examples of Fabrication of Composite Negative Electrodes]

Example 35

Polymer T-1 obtained in the above-described Example 1-2 (1 part), $LiPF_6$ (0.15 parts), natural graphite as a negative electrode active substance (5 parts), and 1,4-dioxane (30 parts) were mixed to obtain a colloidal solution. This colloidal solution was applied on Cu foil and dried completely to thereby obtain a composite negative electrode having a thickness of 50 μm.

Example 36

Polymer T-3 obtained in the above-described Example 2 (1 part), LiPF$_6$ (0.15 parts), coke as a negative electrode active substance (5 parts), and 1,3-dioxorane (30 parts) were mixed to obtain a colloidal solution. This colloidal solution was applied on Cu foil and dried completely, to thereby obtain a composite negative electrode having a thickness of

Comparative Example 7

A composite negative electrode having a thickness of 50 μm was manufactured in the same manner as in Example 35 except that one part of Kynar FLEX 2801 (trade name, product of Elf Atochem Co.) was used in place of polymer T-1, and 30 parts of THF was used as a solvent.

[Examples of Manufacture of Solid Cells]

Example 37

The composite positive electrode obtained in Example 33, the electrolyte obtained in Example 31, and the composite negative electrode obtained in Example 35 were layered, and the entirety was wrapped with aluminum/polyethylene laminate film and was then subjected to heat sealing. Thus, a thin solid cell was manufactured. The solid cell had an effective cell element area of 5×5 cm

Example 38

The composite positive electrode obtained in Example 34, the composite negative electrode obtained in Example 36, and the composite film obtained in Example 32 (before being gelled) were used. An electrolytic solution (ethylene carbonate (EC)/diethylene carbonate (DEC) (volume ratio: 1/1) +1MLiPf$_6$) was applied onto both surfaces of the film in an amount seven times the amount of the polymer carried by the film. Subsequently, the film was immediately placed between the positive and negative electrodes, and was allowed to stand for 24 hours to obtain a cell element (effective area: 5×5 cm).

The cell element was wrapped with aluminum/polyethylene laminate film to complete a thin solid cell.

Comparative Example 8

The composite positive electrode obtained in Comparative Example 5, the electrolyte obtained in Comparative Example 3, and the composite negative electrode obtained in Comparative Example 7 were layered, and the entirety was wrapped with aluminum/polyethylene laminate film and was then subjected to heat sealing. Thus, a thin solid cell was manufactured. The solid cell had an effective cell element area of 5×5 cm.

The cycle characteristics of the thus-obtained cells were measured at room temperature (25° C.) and 60° C. Further, each cell was subjected to 100 times of bending process in which the cell was bent to an angle of 30°, and the capacity retention ratio of the cell was measured. The test results are shown in Table 7.

TABLE 7

| | Cycle characteristics[1] (25° C., %) | Cycle characteristics[1] (65° C., %) | Bending test[2] (%) |
|---|---|---|---|
| Example 37 | 98 | 95 | 90 |
| Example 38 | 97 | 95 | 90 |
| Comp. Ex. 8 | 90 | 80 | 60 |

[1]Capacity at the 200th cycle assuming that the initial capacity of each cell was 100.
Discharge stop voltage was set to 3V, charge stop voltage was set to 4.5V, and charge and discharge were performed at 0.5C at 25° C. and at 1C at 60° C.
[2]Capacity after 100 times of bending tests assuming that the initial capacity of each cell was 100.
Measurement conditions were set to be the same as those in the above 1) for 25° C.

As is apparent from Table 7, through use of a composite solid electrolyte composed of the polymer of the present invention and an electrically insulating material and through use of the polymer of present invention as an electrode material, there were obtained thin film cells that had excellent cycle characteristics at both room temperature and high temperatures and were stable against external stresses such as bending stress. Conceivably, this is because of the fact that since the polymers of the present invention stably hold electrolytic solution and contain a phenyl group therein, the polymers are in close contact with the electrically insulating material and the positive and negative current-collector materials. Therefore, even when the electrodes expand due to discharge of the cell or the respective materials deform due to bending of the cell, the polymers can follow the expansion or deformation, so that the internal resistance is prevented from increasing.

By contrast, in the cell of the Comparative Example, separation of the electrolytic solution from the polymer occurred especially at a high temperature. Also, since the close contact between the electrode materials and the current-collector materials is lost as charge and discharge were repeated, so that degradation in cycle characteristics was observed. In addition, there was observed a decrease in capacity retention ratio caused by bending stress, which decrease is considered to occur because of the same reason as above.

The present invention is not limited to the above-described embodiments. The above-described embodiments are mere examples, and those having the substantially same structure as that described in the appended claims and providing the similar action and effects are included in the scope of the present invention.

For example, the above embodiments are described while mentioning use of the self-crosslinked polymer solid electrolytes of the present invention in a secondary cell. However, the present invention is not limited thereto, but may be effectively applicable to a various other solid electrochemical elements such as primary cells, capacitors, electrochromic displays, and sensors.

What is claimed is:

1. A block-graft copolymer composed of a polymer block chain A and a polymer block chain B at a component ratio of 1:20 to 20:1 and having a degree of polymerization of not less than 210, the polymer block chain A having a recurrent unit as represented by formula I below and a degree of polymerization of not less than 10

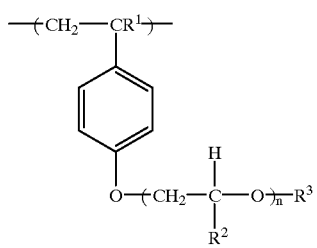

I (wherein $R^1$ represents a hydrogen atom, a methyl group, or an ethyl group; $R^2$ represents a hydrogen atom or a methyl group; $R^3$ represents a hydrogen atom, an alkyl group, an aryl group, an acyl group, a silyl group, or a cyanoalkyl group; n represents an integer between 1 and 100 inclusive; and a graft chain as represented by formula II below has a number average molecular weight of 45 to 4400),

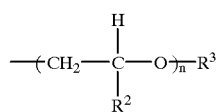

II the polymer block chain B having a recurrent unit as represented by formula III below and a degree of polymerization of not less than 200

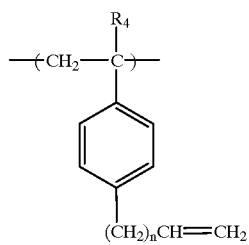

III (wherein $R^4$ represents a hydrogen atom, a methyl group, or an ethyl group; and n represents an integer of 2 or 3).

2. A method of manufacturing a self-crosslinked polymer solid electrolyte, comprising the steps of:

preparing a block-graft copolymer composed of a polymer block chain A and a polymer block chain B at a component ratio of 1:20 to 20:1 and having a degree of polymerization of not less than 210, the polymer block chain A having a recurrent unit as represented by formula I below and a degree of polymerization of not less than 10

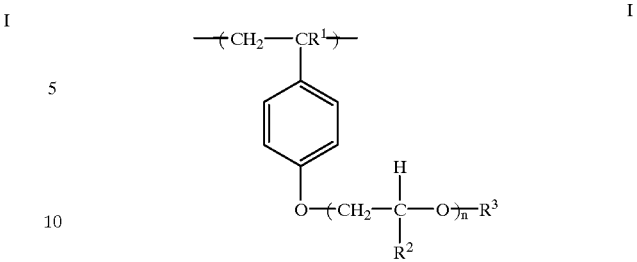

I (wherein $R^1$ represents a hydrogen atom, a methyl group, or an ethyl group; $R^2$ represents a hydrogen atom or a methyl group; $R^3$ represents a hydrogen atom, an alkyl group, an aryl group, an acyl group, a silyl group, or a cyanoalkyl group; n represents an integer between 1 and 100 inclusive; and a graft chain as represented by formula II below has a number average molecular weight of 45 to 4400),

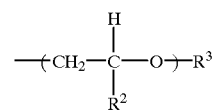

II the polymer block chain B having a recurrent unit as represented by formula III below and a degree of polymerization of not less than 200

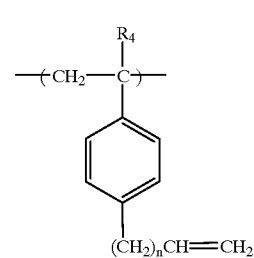

III (wherein $R^4$ represents a hydrogen atom, a methyl group, or an ethyl group; and n represents an integer of 2 or 3);

irradiating a high-energy ray to the block-graft copolymer in order to crosslink the entire system; and adding a nonaqueous electrolytic solution to the block-graft copolymer.

3. A method of manufacturing a self-crosslinked polymer solid electrolyte according to claim 2, wherein said high-energy ray is an electron ray.

4. A method of manufacturing a self-crosslinked polymer solid electrolyte according to claim 2, wherein said non-aqueous electrolytic solution is composed of polyalkylene oxide and a lithium inorganic salt.

5. A method of manufacturing a self-crosslinked polymer solid electrolyte according to claim 3, wherein said non-aqueous electrolytic solution is composed of polyalkylene oxide and a lithium inorganic salt.

6. A method of manufacturing a self-crosslinked polymer solid electrolyte according to claim 2, wherein said non-aqueous electrolytic solution is composed of a lithium inorganic salt and an ester selected from the group consisting of high-boiling-point cyclic carbonic acid esters, low-boiling-point linear esters, and carbonic acid esters.

7. A method of manufacturing a self-crosslinked polymer solid electrolyte according to claim 3, wherein said nonaqueous electrolytic solution is composed of a lithium inorganic salt and an ester selected from the group consisting of high-boiling-point cyclic carbonic acid esters, low-boiling-point linear esters, and carbonic acid esters.

8. A self-crosslinked polymer solid electrolyte which is manufactured by irradiating a high-energy ray to the block-graft copolymer of claim 1 in order to crosslink the entire system and then adding a nonaqueous electrolytic solution thereto.

9. A self-crosslinked polymer solid electrolyte according to claim 8, wherein said high-energy ray is an electron ray.

10. A composite solid electrolyte comprising at least the self-crosslinked polymer solid electrolyte of claim 8 and an electrically insulating material.

11. A composite solid electrolyte comprising at least the self-crosslinked polymer solid electrolyte of claim 9 and an electrically insulating material.

12. A thin solid cell comprising the composite solid electrolyte of claim 10, a positive electrode, and a negative electrode, wherein said positive electrode contains at least the block-graft copolymer of claim 1 and a positive electrode active material, while said negative electrode contains at least the block-graft copolymer of claim 1 and a negative electrode active material.

13. A thin solid cell comprising the composite solid electrolyte of claim 11, a positive electrode, and a negative electrode, wherein said positive electrode contains at least the block-graft copolymer of claim 1 and a positive electrode active material, while said negative electrode contains at least the block-graft copolymer of claim 1 and a negative electrode active material.

14. A positive electrode for use in a thin solid cell, comprising at least the block-graft copolymer of claim 1 and a positive electrode active material.

15. A negative electrode for use in a thin solid cell, comprising at least the block-graft copolymer of claim 1 and a negative electrode active material.

\* \* \* \* \*